US008313400B2

(12) United States Patent
Serkh et al.

(10) Patent No.: US 8,313,400 B2
(45) Date of Patent: Nov. 20, 2012

(54) DAMPED ISOLATOR

(75) Inventors: Alexander Serkh, Troy, MI (US); Lin Zhu, Rochester Hills, MI (US); Matthew Kramp, Canton, MI (US); Imtiaz Ali, Lathrup Village, MI (US); Dean Schneider, Washington, MI (US)

(73) Assignee: The Gates Corporation, Denver, CO (US)

( * ) Notice: Subject to any disclaimer, the term of this patent is extended or adjusted under 35 U.S.C. 154(b) by 703 days.

(21) Appl. No.: 12/291,798

(22) Filed: Nov. 13, 2008

(65) Prior Publication Data

US 2010/0120563 A1 May 13, 2010

(51) Int. Cl.
*F16H 9/04* (2006.01)

(52) U.S. Cl. ................. 474/74; 474/69; 474/70; 464/89

(58) Field of Classification Search .................... 474/69, 474/70, 74; 464/89
See application file for complete search history.

(56) References Cited

U.S. PATENT DOCUMENTS 4,526,257 A * 7/1985 Mueller ....................... 192/48.2
5,139,463 A 8/1992 Bytzek et al. ................... 474/69
5,156,573 A 10/1992 Bytzek et al. ................... 474/74
5,722,909 A * 3/1998 Thomey .......................... 474/87
5,827,143 A * 10/1998 Monahan et al. ............... 474/73
6,083,130 A 7/2000 Mevissen et al. ............... 474/70
7,086,981 B2 * 8/2006 Ali et al. ....................... 475/210
7,153,227 B2 12/2006 Dell et al. ....................... 474/70
7,207,910 B2 4/2007 Dell et al. ....................... 474/74
7,216,621 B2 * 5/2007 Pigott et al. ............... 123/195 A
7,316,628 B2 * 1/2008 Serkh ........................... 475/312
7,591,357 B2 * 9/2009 Antchak et al. .............. 192/55.5
7,758,465 B2 * 7/2010 Serkh et al. .................. 475/318
7,798,928 B2 * 9/2010 Serkh ............................ 474/70
7,815,539 B2 * 10/2010 Ward et al. .................... 475/259
2005/0153813 A1 * 7/2005 Serkh ........................... 475/324
2005/0215366 A1 * 9/2005 Serkh ............................. 474/74

* cited by examiner

*Primary Examiner* — Michael Mansen
*Assistant Examiner* — Michael Riegelman
(74) *Attorney, Agent, or Firm* — J. A. Thurnau, Esq.; P. N. Dunlap, Esq.

(57) ABSTRACT

A damped isolator comprising a first hub, a first pulley connected to the first hub, a bearing carrier connected to the first hub, an elastomeric member engaged with the first hub, a one-way clutch engaged with the elastomeric member, a bearing received by the bearing carrier, a second hub engaged with the one-way clutch and the bearing, and a second pulley connected to the second hub.

10 Claims, 5 Drawing Sheets

50
40
41
60
100
30
72
20
71
70
75
74
73
61
52
51

71
70
20
61
30
51
50
40
75
74
73
41
41
60
72
80

71
70
20
61
3000
51
50
40
75
74
73
41
41
41
60
72
80

DAMPED ISOLATOR

FIELD OF THE INVENTION

The invention relates to a damped isolator, and more particularly, to a damped isolator comprising a first pulley connected to a first hub and an elastomeric isolator disposed between the first hub and a one-way clutch, the one-way clutch connected to a second pulley.

BACKGROUND OF THE INVENTION

Serpentine accessory drive systems are widely used on various vehicle engines including automotive, industrial, truck and bus. A typical serpentine drive system includes a driving pulley on the crankshaft of the vehicle engine. A belt is trained on a series of driven pulleys for the accessories. An advantage of the serpentine drive is that, by providing an automatic belt tensioner in the system, the accessories can be fixedly mounted instead of requiring a means of adjustment to properly tension the belt.

The engine crankshaft by its periodic pulse nature establishes a highly dynamic loading on the belt. This high dynamic loading is due to the variable torque output characteristics of internal combustion engines. The tensioner cannot accommodate all of the variable torque characteristics which causes fluctuations in the belt tension. The result can be noise and decreased belt life due to instantaneous belt slippage between the belt and the pulleys about which it is trained.

Engine crank shaft decouplers are used to deal with the high dynamic belt loading. Generally, the decoupler must have a capacity equal to the system capacity.

Representative of the art is U.S. Pat. No. 5,139,463 to Bytzek et al. which discloses a serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring is disposed in operative relation between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof.

What is needed is a damped isolator comprising a first pulley connected to a first hub and an elastomeric isolator disposed between the first hub and a one-way clutch, the one-way clutch connected to a second pulley. The present invention meets this need.

SUMMARY OF THE INVENTION

The primary aspect of the invention is to provide a damped isolator comprising a first pulley connected to a first hub and an elastomeric isolator disposed between the first hub and a one-way clutch, the one-way clutch connected to a second pulley.

Other aspects of the invention will be pointed out or made obvious by the following description of the invention and the accompanying drawings.

The invention comprises a damped isolator comprising a first hub, a first pulley connected to the first hub, a bearing carrier connected to the first hub, an elastomeric member engaged with the first hub, a one-way clutch engaged with the elastomeric member, a bearing received by the bearing carrier, a second hub engaged with the one-way clutch and the bearing, and a second pulley connected to the second hub.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
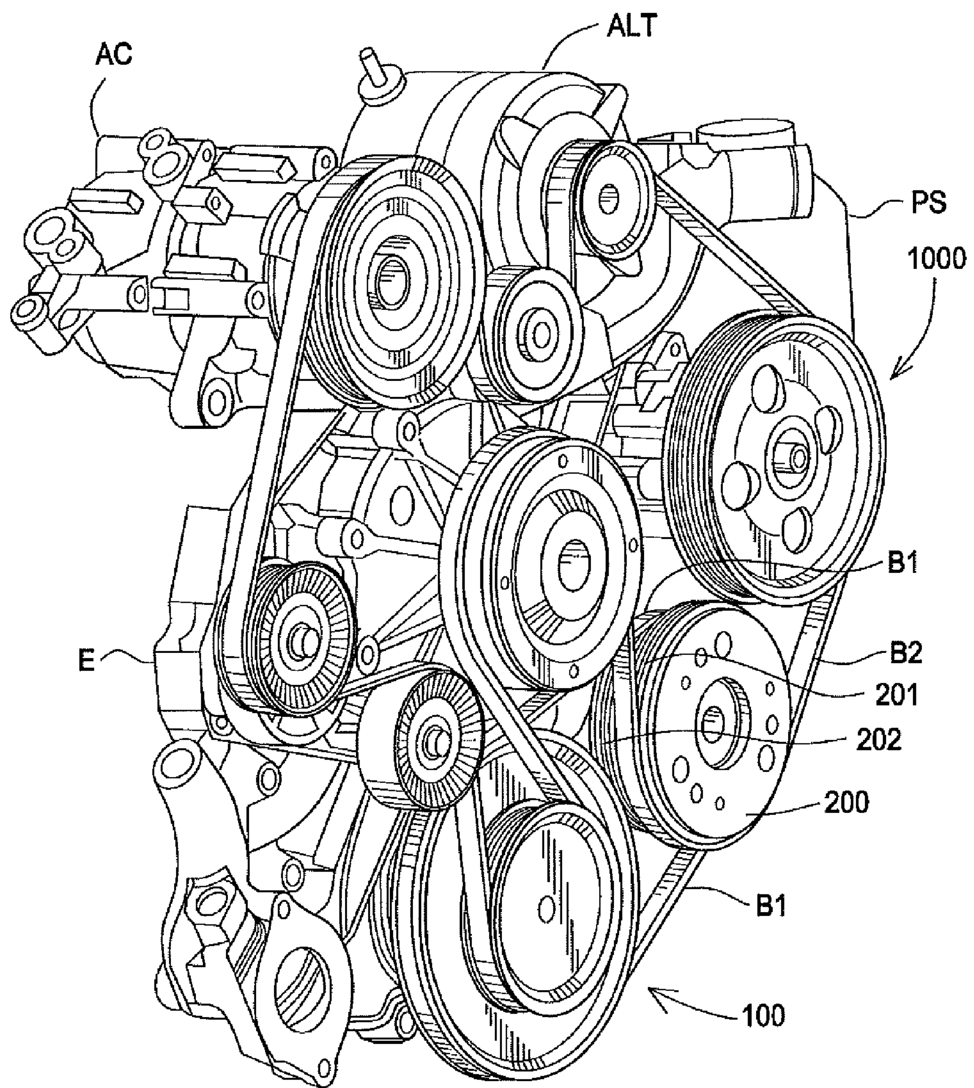
FIG. 1 is a perspective view of an engine.

FIG. 1 is a perspective view of an engine. The inventive damped crankshaft isolator is used on vehicle engine accessory belt drive systems (ABDS) 1000. The isolator 100 is used to reduce the damaging effects of torsional vibration on the crankshaft module of a belted two speed ABDS drive. The ABDS drive includes a first belt B1 and a second belt B2. Belt B1 is connected between the isolator 100 and a two speed module 200. Two speed module 200 comprises an inboard first pulley 201 and an outboard second pulley 202 which are inter-connected by a known electromagnetic clutch (not shown). When the electromagnetic clutch is engaged the first pulley 201 and second pulley 202 rotate in unison. When the electromagnetic clutch is disengaged the second pulley 202 rotates freely by operation of belt B2 being driven by module 100.

ABDS driven accessories include an alternator (ALT), power steering pump (PS), and an air conditioning compressor (AC). Each is connected to and driven by belt B2.

Figure 3:
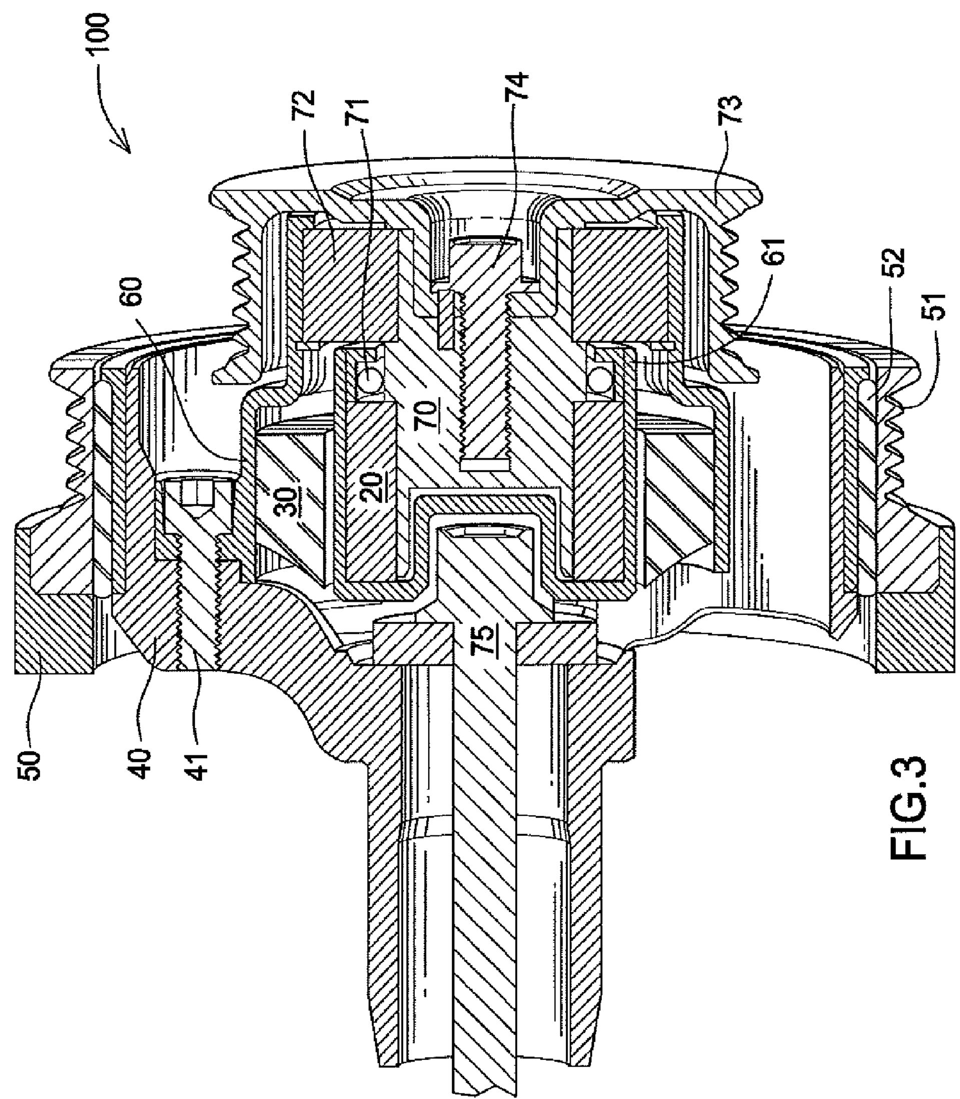
FIG. 3 is a side cross-sectional view of the inventive damped crankshaft isolator.

Generally, isolator 100 is mounted on an engine crankshaft and consists of a large pulley 51 directly connected to the crankshaft and a smaller pulley 73 connected to the crankshaft through a one-way clutch (OWC) 20, see FIG. 3.

Figure 2:
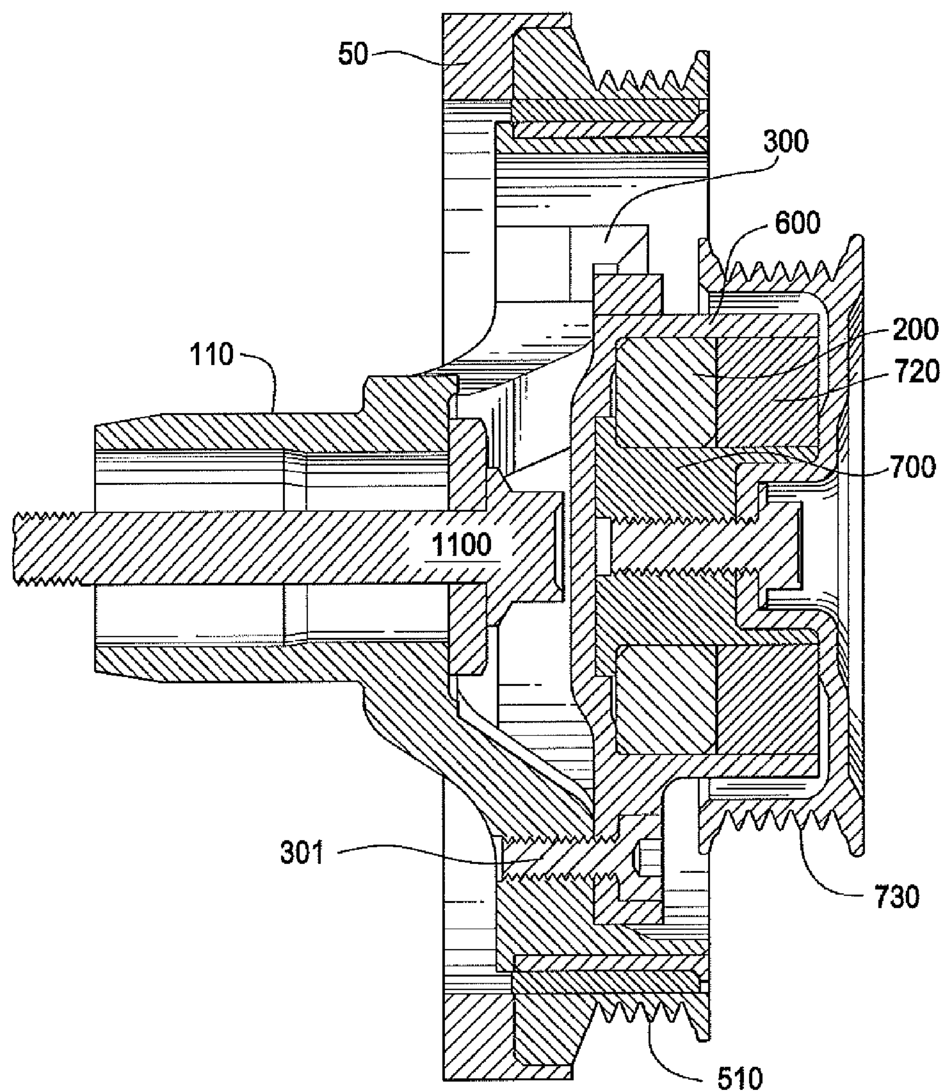
FIG. 2 is a side cross-sectional view of a prior art crankshaft isolator.

FIG. 2 is a side cross-sectional view of a prior art crankshaft isolator. The crankshaft isolator module is mounted to the crankshaft using a crankshaft bolt 1100. Torsional vibration at the crankshaft is transmitted to the outer race of the one-way clutch 200 through a bearing carrier 600. This vibration causes only some of the sprags of the one-way clutch to be repeatedly engaged and disengaged while only a few engaged sprags carry all the torque loads. Over time this hammering effect causes the few sprags that carry the load to wear and they roll over and become inoperable. When this occurs another sprag takes the load until they too become damaged. This process continues until most or all the sprags roll over causing failure of the one-way clutch 200. At this point the crankshaft isolator module becomes unable to transmit torque from the crankshaft to the small pulley.

The prior art isolator comprises a hub 110 and a pulley 510 connected thereto. Pulley 510 and mass 50 comprise the inertia element for the crankshaft damper. The crankshaft damper comprises hub 110, elastic element 300, and inertia element 510 and 50. A bearing carrier 600 is rigidly connected to the hub 110 by fasteners 301. Mounted within the bearing carrier is one-way clutch 200 and a bearing 720. Hub 700 is rotatably engaged with the one-way clutch 200 and the bearing 720. Pulley 730 is fixed to the hub 700.

FIG. 3 is a side cross-sectional view of the inventive damped crankshaft isolator. The inventive isolator 100 protects the one-way clutch 20 by incorporating a resilient member 30 between the hub 40 and the outer race of the one-way clutch 20. This arrangement insulates the one-way clutch 20 from the vibrations at the crankshaft that are transmitted through hub 40.

In particular, the isolator comprises a hub 40. Connected to hub 40 is inertial member 50 and pulley 51. Disposed between the pulley 51 and hub 40 is an elastomeric member 52. Elastomeric member 52 and the inertial members protect the crankshaft from torsional vibration created by the pulsing nature of the internal combustion engine.

An inertial member 50 is fixed to pulley 51. The inertial member comprises a predetermined mass and the elastomeric member possesses a spring rate or stiffness that creates damping effect which is tuned to the natural frequency of the crankshaft. This damping is presently used to protect the crankshaft. Pulley 51 comprises a multi-ribbed profile, but may also comprise a v-profile, flat profile, toothed profile of any other profile suited to the service.

A bearing carrier 60 is fastened to the hub 40 using fasteners 41. Elastomeric damper 30 is disposed within bearing carrier 60. A second bearing carrier 61 is engaged with the elastomeric damper 30. The one-way clutch 20 is received within the carrier 61. The one-way clutch outer race does not rotate or move with respect to the carrier 61.

The inner race of one-way clutch 20 is engaged with hub 70. Also disposed within carrier 61 is seal 71 which prevents debris from contaminating one-way clutch 20. Bearing 72 is received within carrier 60. Hub 70 is rotatably borne by bearing 72 and one-way clutch 20. Pulley 73 is fixed to hub 70 by a fastener 74. Pulley 73 comprises a multi-ribbed profile, but may also comprise a v-profile, flat profile, toothed profile of any other profile suited to the service.

The isolator is fixed to a crankshaft (not shown) using a fastener 75.

The isolator is designed in such a way as to lower the first system natural frequency below the lowest engine firing frequency (i.e hot idle speed). The natural frequency is controlled by the stiffness of the isolator and the inertia of the accessories. Since the inertia of the accessories is fixed, the problem reduces to choosing the correct stiffness of the isolator.

If it is assumed that there is some amount of damping associated with isolator 100, then the natural frequency of the first mode should be such that it is equal to or less than $1/\sqrt{2}$ times the lowest engine firing frequency. As an example, if the idling speed of a vehicle is 650 RPM and it has a 6 cylinder engine, then the forcing frequency is $$
\begin{aligned}
Freq_{Forcing} &= \frac{RPM * \text{Cylinders}}{60 * 2} \\
&= \frac{650 * 6}{120} \\
&= 32.5 \text{ Hz}
\end{aligned}
$$

The natural frequency of the isolator should then be selected to be at most $$1/\sqrt{2}*32.5=22.98 \text{ Hz}.$$

In practice, the natural frequency of the isolator should be chosen well below this value to guarantee good vibration suppression. For example, one may determine that the natural frequency will be half of the lowest firing frequency of 32.5 Hz which will be 16.25 Hz. To achieve this, the spring stiffness for the damper 30 is designed to be:

$$
\begin{aligned}
K_{Rubber} &= I_{eff} w_{natural}^2 \\
&= (0.00145)(16.25 * 2 * \pi)^2 \\
&= 151 \text{ Nm/rad} \\
&= 2.64 \text{ Nm/deg}
\end{aligned}
$$

Where the inertia $I_{eff}$ is the reflected inertia of sum of each of the components in the ABDS system, see FIG. 1. The reflected inertia of each driven accessory component is calculated by multiplying the component inertia by the square of the speed ratio:

$$I_{eff}=\Sigma SR^2 I_{component}$$

The further the natural frequency is away from the idling frequency the better the attenuation of vibration. A suitable goal is to set the natural frequency of the isolator 100 equal to or less than approximately 0.5 times the idling frequency of the engine.

The presence of the damper 30 between the crankshaft and one way clutch 20 reduces the amplitude of vibration transmitted through the one-way clutch 20. This in turn reduces the loads on the sprag or rollers in the one way clutch as explained for FIG. 1. Therefore, the isolator allows the service factor for the one-way clutch 20 to be reduced compared to a module in which there is no damper 30.

Figure 4:
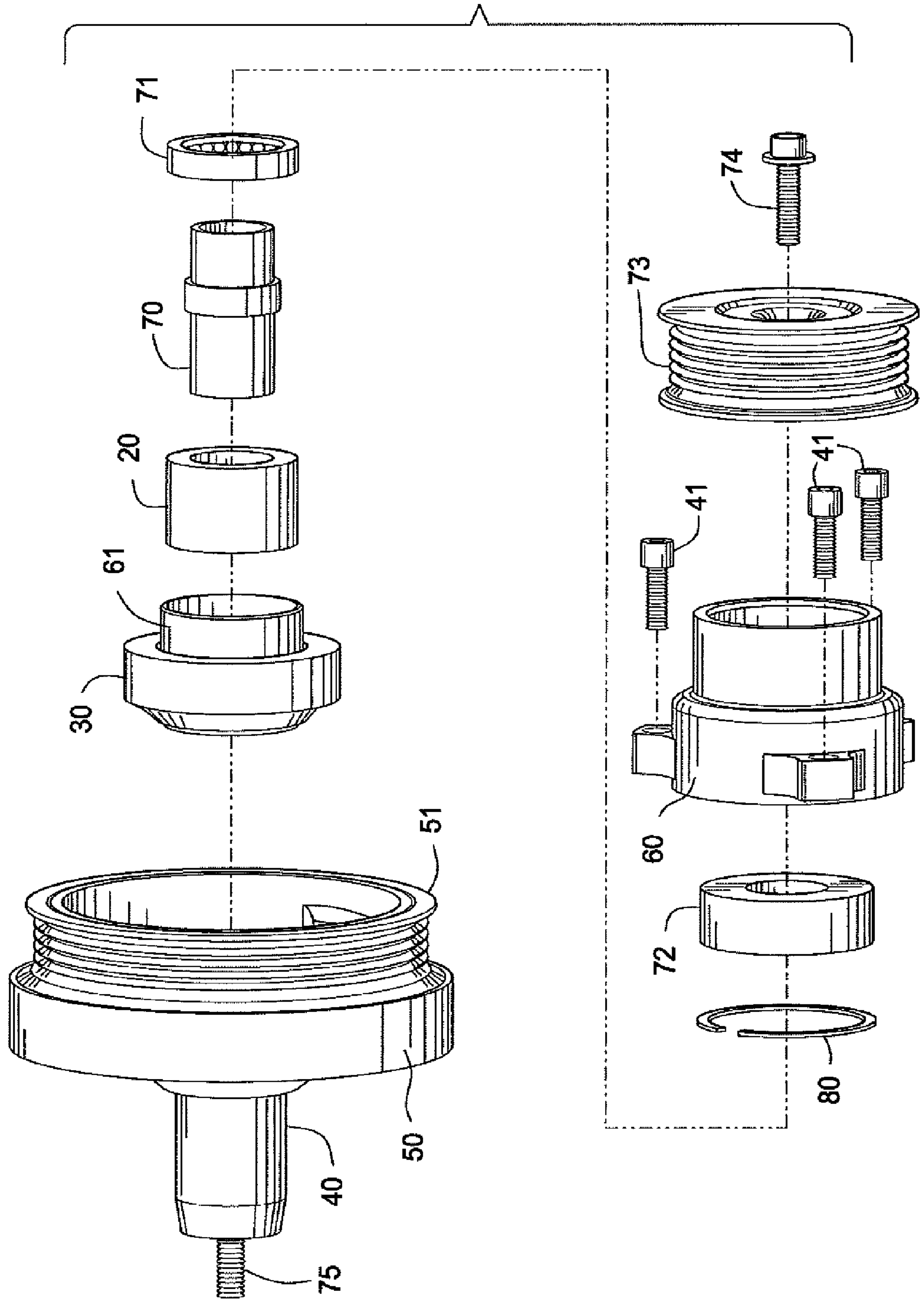
FIG. 4 is an exploded view of the inventive isolator.
Figure 5:
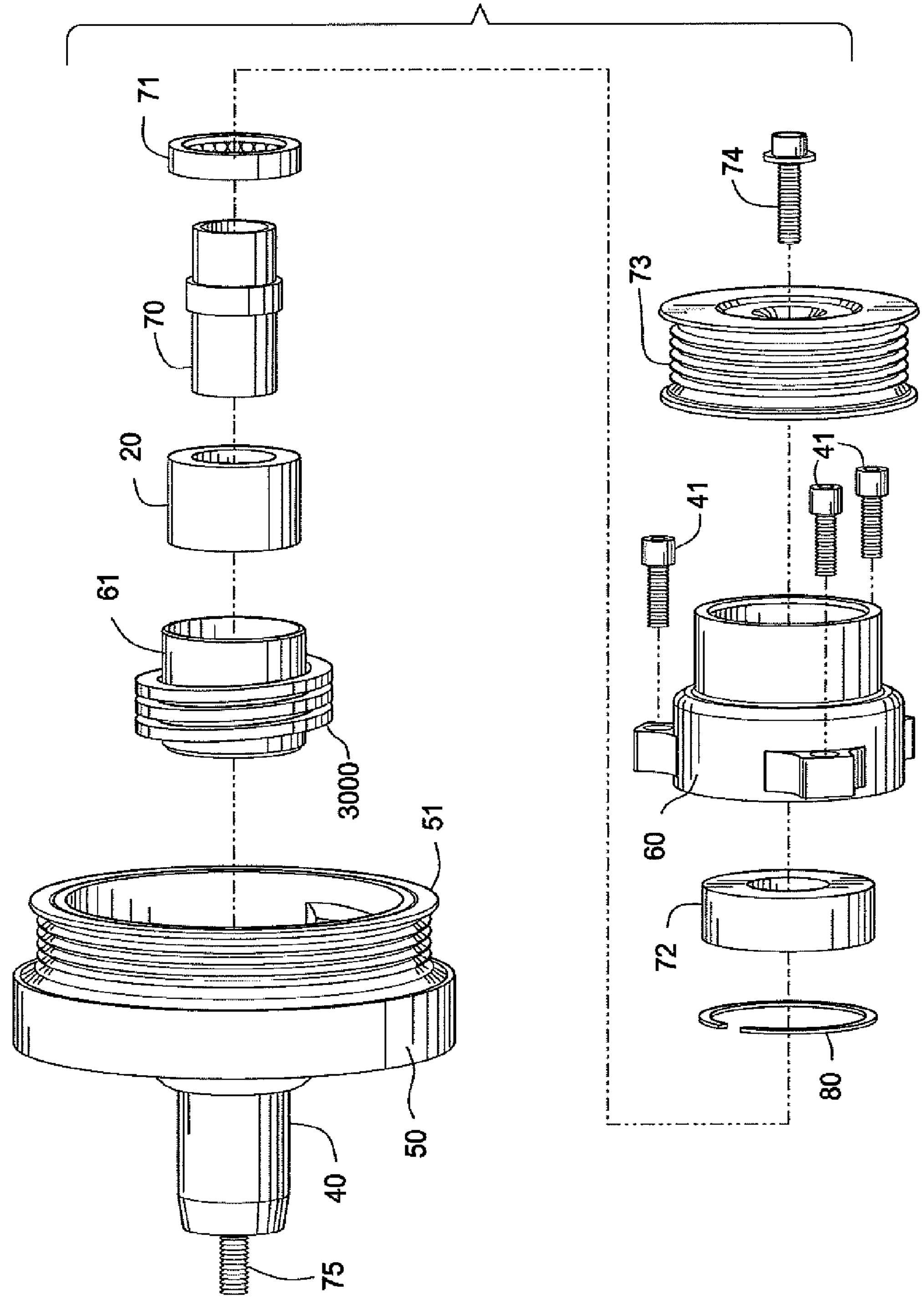
FIG. 5 is an exploded view of an alternate embodiment.

FIG. 4 is an exploded view of the inventive isolator in FIG. 3. Bearing 72 is held in place by a snap ring 80. Snap ring 80 engages carrier 60. Bearing 72 may comprise any suitable bearing known in the art.

In an alternate embodiment the elastomeric member 30 is replaced by a torsion spring 3000. Torsion spring 3000 is connected at one end to the carrier 60 and at the other end to the carrier 61. Spring 3000 performs the same function as damper 30 by damping crankshaft torsional oscillations that might otherwise be transmitted to the one-way clutch 20.

Although a form of the invention has been described herein, it will be obvious to those skilled in the art that variations may be made in the construction and relation of parts without departing from the spirit and scope of the invention described herein.

We claim:

1. A damped isolator comprising:

a first hub (40);

a first pulley (51) connected to the first hub;

a bearing carrier (60) connected to the first hub;

a first elastomeric member (30) connected to the first hub;

a one-way clutch (20);

a bearing (72) received by the bearing carrier;

a carrier member (61) for receiving the one-way clutch;

the carrier member engaged with the first hub through the first elastomeric member, whereby a vibration transmitted from the first hub to the one-way clutch is damped;

a second hub (70) engaged with the one-way clutch and the bearing; and a second pulley (73) connected to the second hub.

2. The damped isolator as in claim 1 further comprising an inertia member connected to the first pulley.

3. The damped isolator as in claim 1, wherein the first pulley and the second pulley comprise a multi-ribbed profile.

4. The damped isolator as in claim 1 further comprising a seal cooperatively engaged with the carrier member.

5. The damped isolator as in claim 1 further comprising a second elastomeric member disposed between the first pulley and the first hub.

6. A damped isolator comprising:

a first hub connected to a first pulley;

an inertia member connected to the first pulley;

a second hub connected to a second pulley;

a one-way clutch operably disposed between the first hub and the second hub, and a first elastomeric member operably disposed between the first hub and the one-way clutch, whereby a vibration transmitted from the first hub to the one-way clutch is damped.

7. The damped isolator as in claim 6 further comprising:

a carrier member for receiving the one-way clutch; and the carrier member connected to the first hub.

8. The damped isolator as in claim 6, wherein the first pulley and the second pulley comprise a multi-ribbed profile.

9. The damped isolator as in claim 6 further comprising a seal cooperatively engaged with the carrier member.

10. The damped isolator as in claim 6 further comprising a second elastomeric member disposed between the first pulley and the first hub.

* * * * *